United States Patent
Han et al.

(10) Patent No.: US 10,895,212 B2
(45) Date of Patent: Jan. 19, 2021

(54) VARIABLE CONTROL METHOD OF AN EXHAUST TEMPERATURE INCREASE IN A DLEV SYSTEM

(71) Applicants: HYUNDAI MOTOR COMPANY, Seoul (KR); KIA MOTORS CORPORATION, Seoul (KR)

(72) Inventors: Kyoung-Chan Han, Gunpo-si (KR); Joon-Hee Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/671,797

(22) Filed: Nov. 1, 2019

(65) Prior Publication Data

US 2020/0182181 A1    Jun. 11, 2020

(30) Foreign Application Priority Data

Dec. 10, 2018   (KR) .................... 10-2018-0158115

(51) Int. Cl.
| | |
|---|---|
| *F02D 41/14* | (2006.01) |
| *F02D 13/02* | (2006.01) |
| *F02D 41/00* | (2006.01) |
| *F02D 41/02* | (2006.01) |

(52) U.S. Cl.
CPC ..... *F02D 41/1446* (2013.01); *F02D 13/0246* (2013.01); *F02D 13/0273* (2013.01); *F02D 41/0065* (2013.01); *F02D 2041/0265* (2013.01)

(58) Field of Classification Search
CPC .. F02D 41/14; F02D 41/1446; F02D 13/0246; F02D 13/0273; F02D 41/0065; F02D 2041/0265
See application file for complete search history.

(56) References Cited

FOREIGN PATENT DOCUMENTS

JP       2016044624 A     4/2016

*Primary Examiner* — Hieu T Vo
(74) *Attorney, Agent, or Firm* — Lempia Summerfield Katz LLC

(57) ABSTRACT

A variable control method of exhaust temperature increase includes, when a cam phaser, which is connected to a double cam shaft having a coaxial arrangement structure of an outer shaft and an inner shaft, is operated and when a cam angle is determined as being varied by a controller, a cam phaser position change control is performed of decreasing a flow rate of an internal exhaust gas recirculation (EGR) supplied to a cylinder of an engine with a cam advance angle, increasing the flow rate of the EGR with a cam retard angle, or blocking the flow rate of the EGR with a maximal cam advance angle.

17 Claims, 7 Drawing Sheets

VARIABLE CONTROL METHOD OF AN EXHAUST TEMPERATURE INCREASE IN A DLEV SYSTEM

CROSS-REFERENCE TO RELATED APPLICATION

This application claims priority to Korean Patent Application No. 10-2018-0158115, filed on Dec. 10, 2018, which is incorporated herein by reference in its entirety.

BACKGROUND

Field of the Disclosure

Various embodiments of the present disclosure relate to control of a double lift exhaust valve (DLEV) system. More particularly, it relates to a DLEV system that implements an exhaust temperature increase variable control.

Description of Related Art

Unlike a variable valve lift (VVL) system, a DLEV system is generally advantageous to improve fuel efficiency and overcome a trade-off limitation on catalyst temperature increase by controlling first and second lift control with respect to an exhaust valve.

For example, the DLEV system forms a minute opening of an exhaust valve during an intake stroke and suctions a high-temperature exhaust gas again to achieve highest efficiency of exhaust temperature increase.

Therefore, an operation of the DLEV system allows a flow rate of an internal exhaust gas recirculation (EGR) to be constantly supplied to an interior of a cylinder of an engine according to an exhaust valve timing, thereby increasing an initial combustion temperature due to an increase of an EGR rate in the cylinder. The increase of the initial combustion temperature results in a $NO_x$ reduction effect as well as an increase of a temperature of a finally exhausted gas.

Consequently, in improvement of fuel efficiency resulting in a reduction in exhaust energy, a light-off time (LOT) of an exhaust catalyst (i.e., a catalyst reaction time) is not retarded such that a trade-off limitation between fuel efficiency and the catalyst temperature increase is overcome to some extent.

However, in the DLEV system, an adjustment of the EGR rate is performed by cam on/off control. Thereby, there is a mechanical limitation since continuous EGR control is difficult. Thus, when an engine operating point is drastically varied, the limitation inevitably causes a drastic rise in the EGR rate resulting in excessive generation of particulate matter (PM).

Therefore, as measures for substituting continuity of the EGR control, an operating range reduction for preventing an unburned gas or an exhaust valve lift reduction method in consideration of degradation of temperature increase performance should be applied to the DLEV system.

However, exhaust regulations for securing $NO_x$ purification performance, reducing a $NO_x$ emission amount, extending a test temperature condition, and strengthening $CO_2$ regulations require exhaust gas temperature increase, and this requires continuous EGR control for the DLEV system.

For example, a low-temperature urban congestion mode is applied for securing the $NO_x$ purification performance. "$NO_x$<35 to 40 mg/km and CF: 1" are required for reducing the $NO_x$ emission amount. A temperature in the range of "−10 to 35 degrees" is required for extending the test temperature condition, and 95 g/km is required in strengthening of the $CO_2$ regulations and measuring fuel efficiency on an actual road.

Consequently, a reduction in operating area and in exhaust valve lift for the DLEV system cannot meet exhaust regulations.

SUMMARY OF THE DISCLOSURE

An embodiment of the present disclosure is directed to a double lift exhaust valve (DLEV) system in which a flow rate of an internal exhaust gas recirculation (EGR) with respect to an interior of a cylinder of an engine is continuously controlled according to an exhaust valve timing by a variable control on a cam. The flow rate of the EGR is continuously controlled such that, even when the engine operating point is drastically varied, the exhaust temperature increase required during an adjustment of a light-off time (LOT) to meet exhaust regulations may be achieved according to an engine operating condition and a required amount of the exhaust temperature increase. Particularly, the DLEV system is implemented in a DLEV structure of a coaxial cam shaft type, thereby implementing an exhaust temperature increase variable control capable of achieving a mechanical simplification for stability of continuous EGR control and for productivity improvement. The disclosed DLEV system is thus capable of achieving an exhaust temperature increase required during adjustment of a light-off time (LOT) to meet exhaust regulations through a flow rate of internal EGR supplied to a cylinder of an engine by means of continuous control by varying an exhaust valve timing.

Other objects and advantages of the present disclosure can be understood by the following description and can become apparent with reference to the embodiments of the present disclosure. Also, it is to be understood by those of ordinary skill in the art to which the present disclosure pertains that the objects and advantages of the present disclosure can be realized by the means as claimed and combinations thereof.

In accordance with an embodiment of the present disclosure, there is provided a variable control method of exhaust temperature increase. The variable control method includes, when a cam phaser is operated, the cam phaser being connected to a double cam shaft having a coaxial arrangement structure of an outer shaft and an inner shaft, and when a cam angle is determined as being varied by a controller, a cam phaser position change control is performed. The cam phaser position change control decreases a flow rate of an internal exhaust gas recirculation (EGR) supplied to a cylinder of an engine with a cam advance angle, increases the flow rate of the EGR with a cam retard angle, or blocks the flow rate of the EGR with a maximal cam advance angle.

The cam advance angle may be determined through a catalyst temperature increase by a light-off time (LOT) of a catalyst for purifying an exhaust gas emitted from the engine. The cam advance angle may be achieved by a cam advance angle control. The cam advance angle control may include determining a change of a cam angle of a double cam shaft to the cam advance angle according to an operating condition of the engine, determining the change of the cam angle to the cam advance angle based on an engine combustion condition or an exhaust gas purification condition, and checking the change of the cam angle to the cam advance angle through determining of the cam advance angle.

The operating condition may include one or more among an engine speed, an engine load, and a required amount of the catalyst temperature increase. Each of the engine speed, the engine load, and the required amount of the catalyst temperature increase may be detected in an urban congestion section.

The engine combustion condition of the cam advance angle control may be applied when a detected air/fuel mixture ratio is smaller than a threshold of an air/fuel mixture ratio. The exhaust gas purification condition may be applied when a detected oxygen concentration stored in the catalyst is smaller than a threshold of an oxygen concentration stored in the catalyst.

The cam retard angle may be determined by an increase in flow rate of the internal EGR, and the cam retard angle may be achieved by a cam retard angle control. The cam retard angle control may include determining a change of a cam angle of a double cam shaft to the cam retard angle according to an operating condition of the engine. The cam retard angle control may further include checking the change of the cam angle to the cam retard angle through determining of the cam retard angle.

The operating condition of the cam retard angle control may include one or more among an engine speed, an engine load, and a required amount of the catalyst temperature increase. Each of the engine speed, the engine load, and the required amount of the catalyst temperature increase may be detected in an urban congestion section.

A maximal cam advance angle may be determined by blocking of the flow rate of the internal EGR, and the maximal cam advance angle is achieved by a maximal cam advance angle control. The maximal cam advance angle control may be performed by changing the cam angle of the double cam shaft to the maximal cam advance angle.

In accordance with another embodiment of the present disclosure, there is provided a DLEV system. The DLEV system includes a controller configured to change a cam angle by performing a cam advance angle control in which a flow rate of an internal EGR supplied to a cylinder of an engine is decreased due to a cam advance angle, a cam retard angle control in which the flow rate of the internal EGR is increased due to a cam retard angle, and a maximal cam advance angle control in which the flow rate of the internal EGR is blocked due to a maximal cam advance angle. The DLEV system further includes a double cam shaft. The double cam shaft has a main cam, a first secondary cam, and a second secondary cam to allow the cam angle of a double cam to be changed due to the cam advance angle, the cam retard angle, or the maximal cam advance angle. The double cam shaft is configured to be connected to a cam phaser.

The double cam shaft may include an outer shaft to which the main cam is coupled, and an inner shaft configured to be surrounded by the main cam to position the first secondary cam to a left side of the main cam and to position the second secondary cam to a right side of the main cam.

The first secondary cam and the second secondary cam may be fixed to the inner shaft via a power transmission key.

DESCRIPTION OF SPECIFIC EMBODIMENTS

Various embodiments of the present disclosure are described below in more detail with reference to the accompanying drawings. These embodiments are examples of the present disclosure and may be embodied in various other different forms by those of ordinary skill in the art to which the present disclosure pertains so that the present disclosure is not limited to these embodiments.

Figure 1:
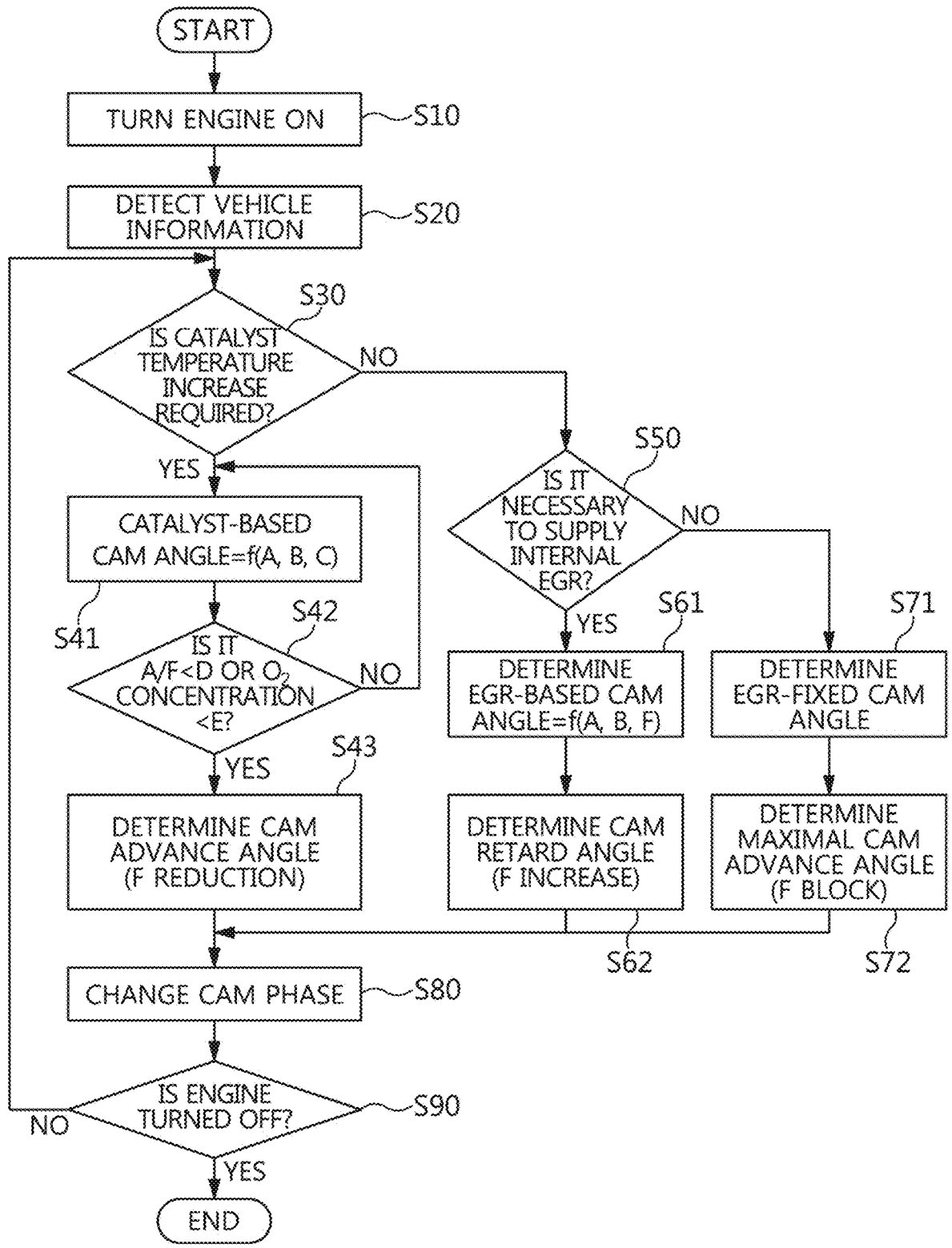
FIG. 1 is a flowchart of a variable control method of exhaust temperature increase implemented in a double lift exhaust valve (DLEV) system according to the present disclosure.

Referring to FIG. 1, a variable control method of exhaust temperature increase performs cam phase position change control (S80) for a double lift exhaust valve (DLEV) system using one among a cam advance angle control (S30 to S43) between turning an engine on (S10) and turning the engine off (S90), a cam angle retard control (S30, S50, S61, and S62), and a maximal cam advance angle control (S30, S50, S71, and S72).

In particular, the cam advance angle control (S30 to S43) allows a flow rate of an exhaust gas recirculation (EGR) to minimally flow as a flow rate of an internal EGR flow rate through an exhaust valve in a catalyst temperature increase necessary condition (S30). The cam angle retard control (S30, S50, S61, and S62) allows the flow rate of the EGR to maximally flow as the flow rate of the internal EGR through the exhaust valve in a catalyst temperature increase unnecessary condition (S30) and in an internal EGR necessary condition (S50). The maximal cam advance angle control (S30, S50, S71, and S72) prevents the flow rate of the EGR from flowing as the flow rate of the internal EGR through the exhaust valve in the catalyst temperature increase unnecessary condition (S30) and in an internal EGR unnecessary condition (S50).

Consequently, the variable control method of exhaust temperature increase may satisfy strengthened exhaust regulations due to a light-off time (LOT) effect of an exhaust catalyst without degradation in particulate matter (PM) of an exhaust gas and fuel efficiency according to a variable control of the flow rate of the internal EGR in the cylinder by the DLEV system.

Figure 2:
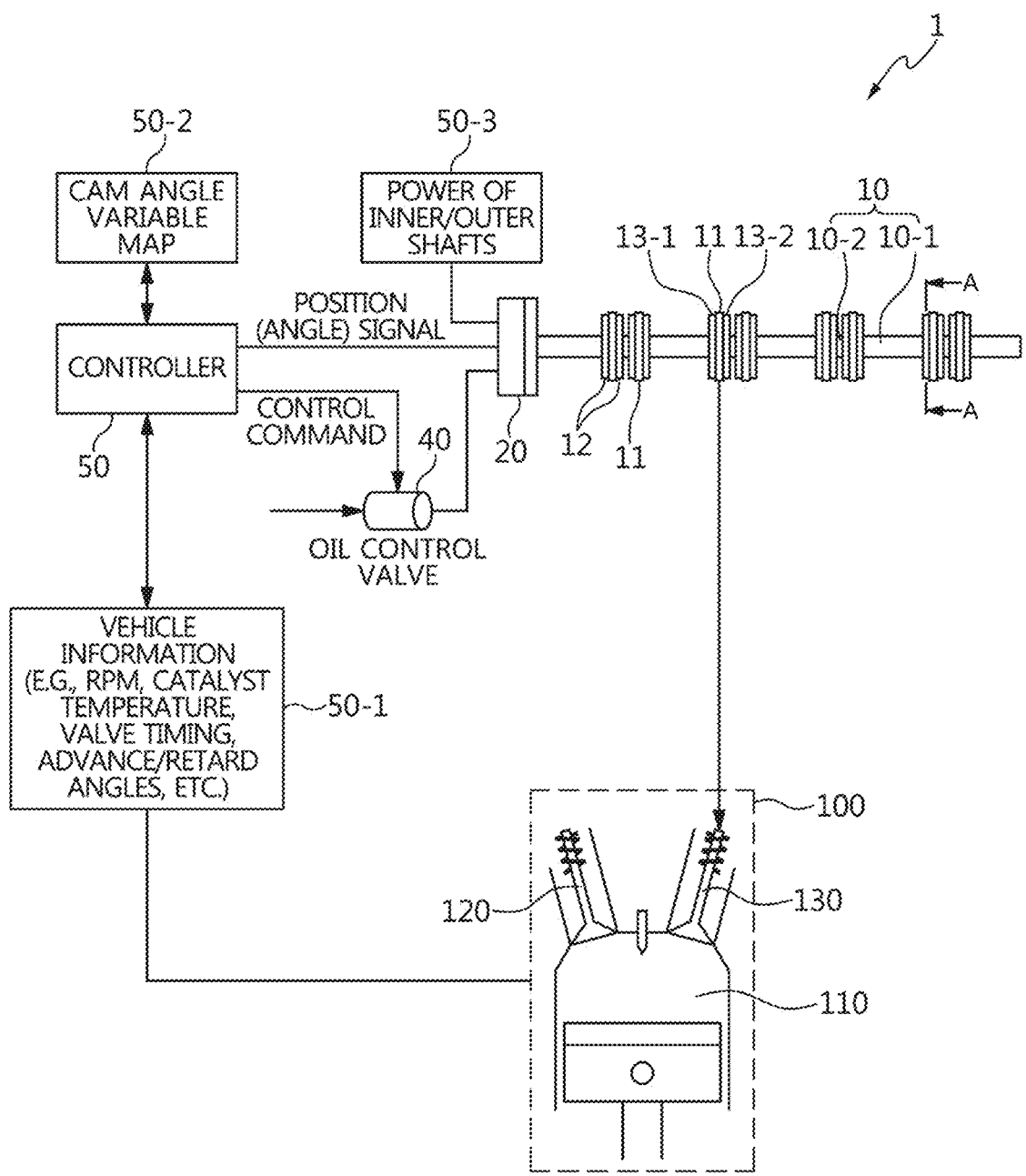
FIG. 2 is a diagram illustrating an example of the DLEV system to which variable control of exhaust temperature increase according to the present disclosure is applied.

Referring to FIG. 2, a DLEV system 1 is installed at an engine 100 to control a valve lift timing of an exhaust valve 130 (and an intake valve 120) of a cylinder 110. To this end, the DLEV system 1 includes a double cam shaft 10, a double cam 12, a cam phaser 20, an oil control valve 40, and a controller 50.

For example, the double cam shaft 10 includes an outer shaft 10-1 and an inner shaft 10-2 coupled to be surrounded by the outer shaft 10-1 such that the double cam shaft 10 is configured in a coaxial arrangement structure. The double cam 12 is divided into a main cam 11 and a secondary cam 13. The main cam 11 is coupled to the outer shaft 10-1 and the secondary cam 13 is coupled to the inner shaft 10-2. In particular, the secondary cam 13 is further divided into first and second secondary cams 13-1 and 13-2. The first secondary cam 13-1 is located at a left side of the main cam 11, and the second secondary cam 13-2 is located at a right side thereof.

For example, the cam phaser 20 is operated in response to position/angle control commands of the controller 50 to connect power 50-3 to the outer and inner shafts 10-1 and 10-2. The cam phaser 20 forms a valve lift due to a variable timing to allow the exhaust valve 130 to form a primary opening (i.e., a first lift) and a secondary opening (i.e., a second lift) using low/high pressures (or high/low pressures) formed according to opening/closing of a flow path of an oil control valve 40.

For example, the oil control valve 40 forms a low pressure when the flow path is closed using oil of a main gallery provided in the engine 100, whereas the oil control valve 40 forms a high pressure when the flow path is opened such that the oil control valve 40 is operated to supply a hydraulic pressure for varying rotational angles of the main cam 11 and the first and second secondary cams 13-1 and 13-2 according to operations of the outer and inner shafts 10-1 and 10-2.

For example, the controller 50 has a vehicle information inputter 50-1 and a cam angle variable map 50-2.

While the engine 100 operates, the vehicle information inputter 50-1 detects an engine load, an engine speed (or revolutions per minute (RPM)), a catalyst temperature, an air/fuel mixture ratio A/F, an $O_2$ concentration, a vehicle speed, a flow rate of an EGR, an EGR rate, and the like as vehicle information. The vehicle information inputter 50-1 further detects valve timings of the intake and exhaust valves 120 and 130, cam advance and retard angles of the main cam 11 and the first and second secondary cams 13-1 and 13-2, and the like as system information of the DLEV system 1. The vehicle information inputter 50-1 provides the vehicle information and the system information to the controller 50. In this case, the catalyst temperature is obtained from any one among a selective catalyst reduction (SCR), a diesel particulate filter (DPF), a diesel oxidation catalyst (DOC), a catalyzed particulate filter (CPF), and a three-way catalyst (TWC). However, in the present embodiment, the catalyst temperature may be obtained from the SCR.

The cam angle variable map 50-2 constructs a table to be matched to the vehicle information of the vehicle information inputter 50-1. In addition to a basic control value of a cam angle through the matching, the cam angle variable map 50-2 provides the cam advance angle, the cam retard angle, a maximal cam advance angle, the catalyst temperature, and a required amount of catalyst temperature increase to the controller 50 as conditional control values, thereby allowing the controller 50 to generate an output command. In particular, the cam angle variable map 50-2 calculates the required amount of catalyst temperature increase by the table mapping or by calculating a difference between a detected catalyst temperature and a LOT of the catalyst.

Figure 3:
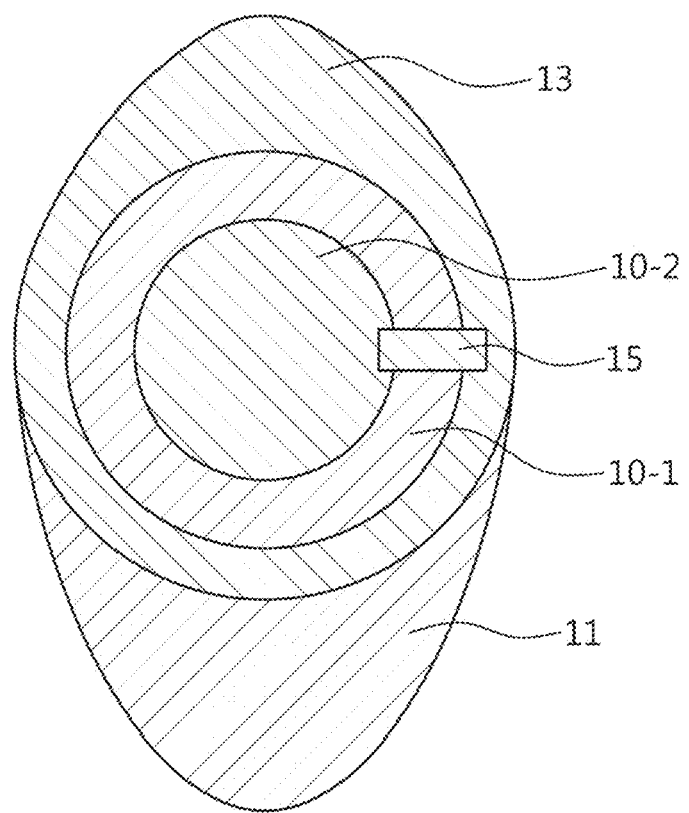
FIG. 3 is a cross-sectional view illustrating main and secondary cams of the DLEV system according to the present disclosure.

Referring to FIG. 3, a coupling structure of the double cam shaft 10 and the double cam 12 having the main cam 11 and the secondary cam 13 through a power transmission key 15 is illustrated. As shown in the drawing, the power transmission key 15 is coupled to fix the inner shaft 10-2 to the secondary cam 13 (i.e., the first and second secondary cams 13-1 and 13-2) to not be in conjunction with the outer shaft 10-1 and the main cam 11.

Therefore, a movement of the secondary cam 13 (i.e., the first and second secondary cams 13-1 and 13-2) by the inner shaft 10-2 is independently performed with respect to a movement of the main cam 11 by the outer shaft 10-1.

The variable control method of exhaust temperature increase of FIG. 1 is described in detail below with reference to FIGS. 2 to 5. In this case, a control main body is described as the controller 50, and control targets are described as the main cam 11 and the first and second secondary cams 13-1 and 13-2 of the DLEV system 1.

The controller 50 performs operation of a vehicle information detection (S20) between the turning the engine 100 on (S10) and the turning the engine 100 off (S90).

Referring to FIG. 2, the controller 50 checks an engine operation by detecting the engine load, the engine speed (or RPM), the catalyst temperature, the A/F, the $O_2$ concentration, the vehicle speed, the flow rate of the EGR, the EGR rate, and the like, which are provided from the vehicle information inputter 50-1, as vehicle information. The controller further checks an operation of the DLEV system 1 by detecting the valve timings of the intake and exhaust valves 120 and 130, the cam advance and retard angles of the main cam 11 and the first and second secondary cams 13-1 and 13-2, the catalyst temperature, the required amount of catalyst temperature increase, and the like as the system information.

Figure 4:
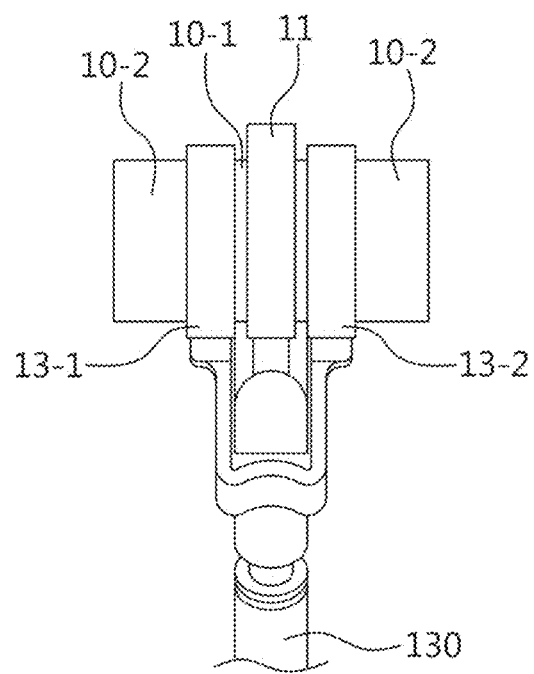
FIG. 4 is a diagram illustrating an operating state of the DLEV system through the main and secondary cams according to the present disclosure.

Referring to FIG. 4, the double cam 12 positions the main cam 11 and the first and second secondary cams 13-1 and 13-2 at an upper end portion of the exhaust valve 130. In this state, a rotation of the main cam 11 pressurizes the upper end portion thereof to form a primary opening (i.e., a first lift) of the exhaust valve 130, and rotations of the first and second secondary cams 13-1 and 13-2 pressurizes the upper end portion thereof again to form a secondary opening (i.e., a second lift) of the exhaust valve 130.

Consequently, when the DLEV system 1 operates according to the control command using a position (angle) signal of the controller 50, the cam phaser 20 rotates the outer and inner shafts 10-1 and 10-2 with the hydraulic pressure through the operation of the oil control valve 40 such that, in a state of the primary opening (i.e., the first lift) of the exhaust valve 130, the secondary opening (i.e., the second lift) of the exhaust valve 130 is variably formed through the first and second secondary cams 13-1 and 13-2.

Subsequently, when operation S30 of determining a catalyst temperature increase necessary condition is executed, the controller 50 determines the catalyst temperature increase requirement by comparing the catalyst temperature checked in the vehicle information detection (S20) with the LOT of the catalyst.

Regarding the determination result, when the catalyst temperature determined in the catalyst temperature increase necessary condition (S30) is less than the LOT of the catalyst, the controller 50 determines the catalyst temperature increase necessary condition as being satisfied to execute the cam advance angle control (S41 to S43). Otherwise, when the catalyst temperature determined in the catalyst temperature increase requirement (S30) is greater than or equal to the LOT of the catalyst, the controller 50 switches to the internal EGR necessary condition (S50).

Subsequently, the controller 50 performs the cam advance angle control (S41 to S43) with operation S41 of calculating a catalyst-based cam angle, operation S42 of determining adjustment of the flow rate of the internal EGR, and operation S43 of determining the cam advance angle.

In one example, operation S41 of calculating the catalyst-based cam angle is performed by applying at least three catalyst temperature increase parameters classified as A, B, and C in the operating condition of the engine 100 and applying an application condition to each of the at least three catalyst temperature increase parameters. Specifically, the catalyst temperature increase parameter A is the engine speed, and an application condition of the catalyst temperature increase parameter A is an urban congestion section. The catalyst temperature increase parameter B is the engine load, and an application condition of the catalyst temperature increase parameter B is the urban congestion section.

The catalyst temperature increase parameter C is the required amount of catalyst temperature increase, and an application condition of the catalyst temperature increase parameter C is the LOT of the catalyst.

As a result, in operation S41 of calculating the catalyst-based cam angle, the flow rate of the internal EGR is calculated in consideration of the engine speed, the engine load, and the required amount of catalyst temperature increase. The cam advance angle is calculated (or determined) according to the calculation of the flow rate of the internal EGR. In this case, the calculation of the flow rate of the internal EGR is a direction in which the flow rate of the internal EGR is decreased relative to the present time. Further, a procedure and a method of the calculation are identical to those of the existing calculation of the flow rate of the internal EGR and the existing calculation (or determination) of the cam advance angle.

For example, operation S42 of determining adjustment of the flow rate of the internal EGR is performed by applying an engine combustion condition or an exhaust gas purifying condition. A determination formula for an air/fuel mixture ratio (below) is applied to the engine combustion condition, and a determination formula for an oxygen concentration (below) is applied to the exhaust gas purifying condition.

Determination formula of air/fuel mixture ratio: A/F<D

Determination formula of oxygen concentration: $O_2$ concentration <E

In this embodiment, "A/F" is a detected air/fuel mixture ratio, "D" is a threshold of the air/fuel mixture ratio and is variably set according to a variation in engine load in the urban congestion section, "$O_2$ concentration" is a detected oxygen concentration stored in the catalyst, and "E" is a threshold of the oxygen concentration stored in the catalyst and is set to an oxygen concentration which is not required to perform an $O_2$ purge. In this case, the $O_2$ purge is a logic for removing $O_2$ to prevent excessive $O_2$ from being stored in the catalyst or prevent formation of oxidation catalyst atmosphere.

As a result, when the A/F is greater than the threshold of the air/fuel mixture ratio, or the $O_2$ concentration is greater than the threshold of the oxygen concentration stored in the catalyst, since the catalyst temperature should be maintained in a current state, the procedure returns to operation S41 of calculating the catalyst-based cam angle to check the catalyst temperature increase parameters classified as A, B, and C again. Otherwise, when the A/F is smaller than the threshold of the air/fuel mixture ratio, or the $O_2$ concentration is smaller than the threshold of the oxygen concentration stored in the catalyst, since the catalyst temperature should be lowered relative to the current state, operation S43 of determining the cam advance angle is executed.

For example, in operation S43 of determining the cam advance angle, a cam advance angle is determined to adjust the valve timing of the exhaust valve 130 to the cam advance angle.

Subsequently, the controller 50 adjusts the cam phaser 20 with the cam advance angle through changing of a position of the cam phaser 20 (S80).

Figure 5:
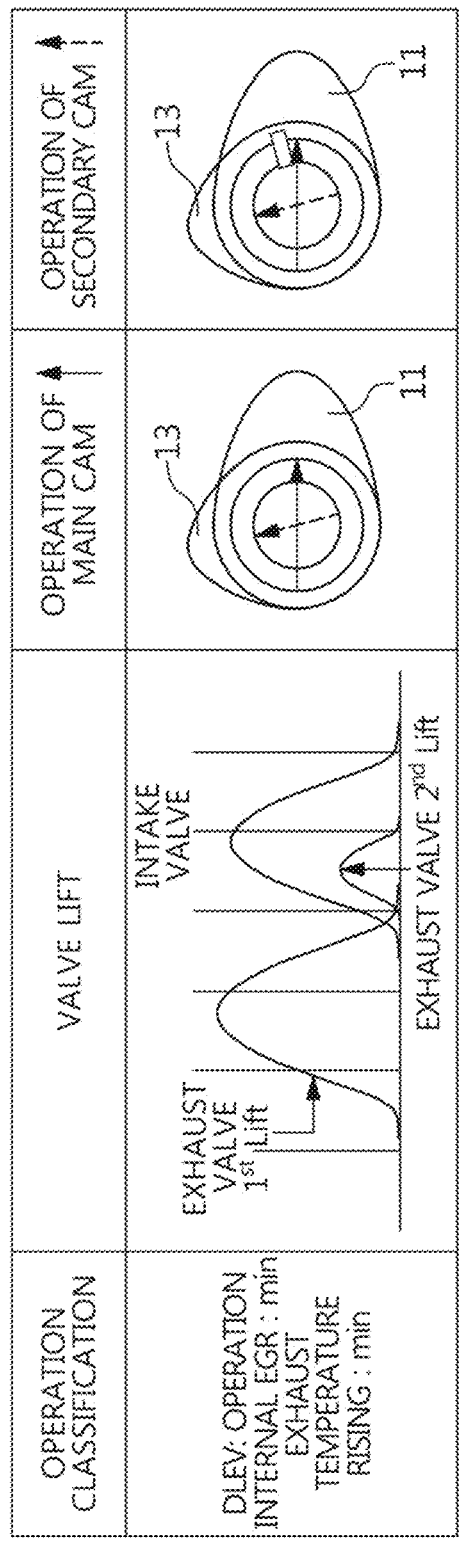
FIGS. 5-7 are diagrams showing states in which positions of the main and secondary cams are moved to vary a lift of an exhaust valve according to the present disclosure.

Referring to FIG. 5, the cam advance angle control (S41 to S43) forms a release timing of the secondary lift (i.e., the second lift) subsequent to a release timing of the primary lift (i.e., the first lift) of the exhaust valve 130 as an opening timing of the exhaust valve 130 according to the same direction of an opening timing of the intake valve 120 such that the exhaust valve 130 is opened for a predetermined period of time due to the advance angle. Thus, the internal EGR control, in which the flow rate of the EGR is minimally supplied to the cylinder 110 of the engine 100 as the flow rate of the internal EGR, is performed.

When the determining of the internal EGR necessary condition (S50) is executed, the controller 50 directly determines the flow rate of the internal EGR on the basis of the flow rate of the EGR or the EGR rate, which is detected in the detecting of the vehicle information (S20), or indirectly determines the flow rate of the internal EGR on the basis of the valve timing or the cam advance/retard angles.

Therefore, in the determining of the internal EGR necessary condition (S50), the cam angle retard control (S61 and S62) for allowing the flow rate of the EGR to maximally flow as the flow rate of the internal EGR is performed through the catalyst temperature increase unnecessary condition (S30) and the internal EGR necessary condition (S50). Alternatively, the maximal cam advance angle control (S71 and S72) for preventing the flow rate of the EGR from flowing through the exhaust valve 130 as the flow rate of the internal EGR in the internal EGR unnecessary condition (S50) is performed.

Subsequently, the controller 50 performs the cam retard angle control (S61 to S62) with operation S61 of calculating an EGR-based cam angle, and operation S62 of determining a cam retard angle.

For example, operation S61 of calculating the EGR-based cam angle is performed by applying at least three catalyst temperature increase parameters classified as A, B, and C in the operating condition of the engine 100 and applying an application condition to each of the at least three catalyst temperature increase parameters. Specifically, the catalyst temperature increase parameter A is the engine speed, and an application condition of the catalyst temperature increase parameter A is an urban congestion section. The catalyst temperature increase parameter B is the engine load, and an application condition of the catalyst temperature increase parameter B is the urban congestion section. The catalyst temperature increase parameter C is the required amount of catalyst temperature increase, and an application condition of the catalyst temperature increase parameter C is the LOT of the catalyst.

As a result, in operation S61 of calculating the EGR-based cam angle, the flow rate of the internal EGR is calculated in consideration of the engine speed, the engine load, the required amount of catalyst temperature increase, and the cam retard angle is calculated (or determined) according to the calculation of the flow rate of the internal EGR. In this case, the calculation of the flow rate of the internal EGR is a direction in which the flow rate of the internal EGR is increased relative to the present time. Further, a procedure and a method of the calculation are identical to those of the existing calculation of the flow rate of the internal EGR and the existing calculation (or determination) of the cam retard angle.

For example, in operation S62 of determining the cam retard angle, a cam retard angle is determined to adjust the valve timing of the exhaust valve 130 to the cam retard angle.

Subsequently, the controller 50 adjusts the cam phaser 20 with the cam retard angle through changing of a position of the cam phaser 20 (S80).

Figure 6:
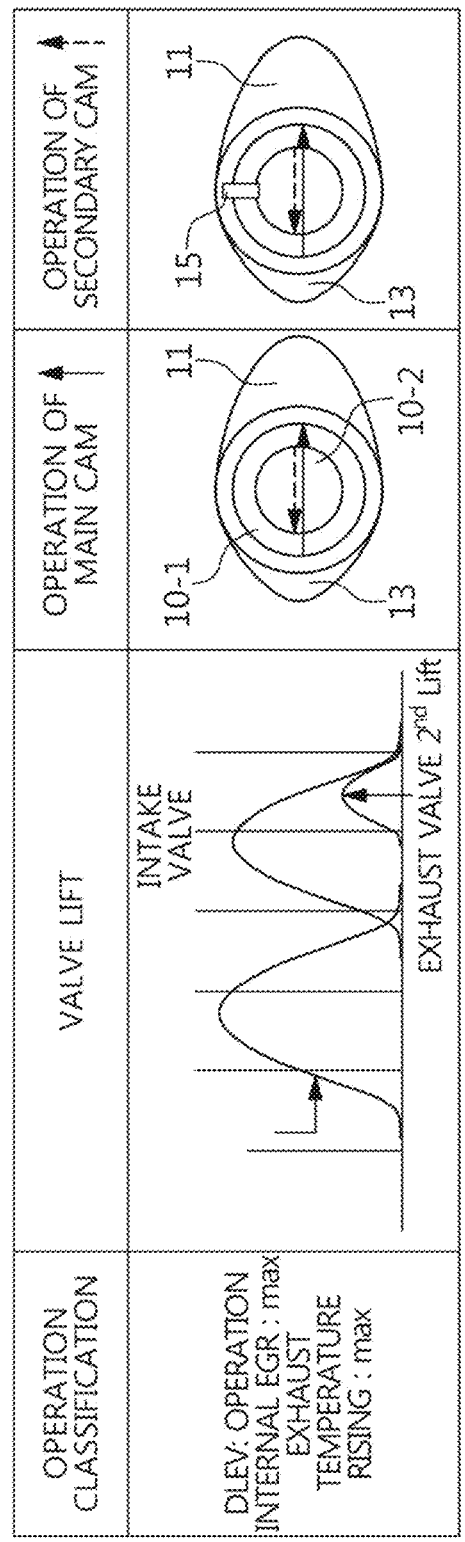

Referring to FIG. 6, the cam advance angle control (S61 and S62) forms the release timing of the secondary lift (i.e., the second lift) subsequent to the release timing of the primary lift (i.e., the first lift) of the exhaust valve 130 as a closing timing of the exhaust valve 130 according to the same direction of a closing timing of the intake valve 120 such that the internal EGR control, in which the flow rate of the EGR is maximally supplied to the cylinder 110 of the engine 100 as the flow rate of the internal EGR, is performed due to the retard angle.

The controller 50 performs the maximal cam advance angle control (S71 and S72) with operation S71 of calculating an EGR-fixed cam angle, and operation S72 of determining a maximal cam advance angle.

For example, in the calculation of the EGR-fixed cam angle (S71), since the required amount of catalyst temperature increase is not present in the operating condition of the engine 100, a supply of the flow rate of the internal EGR flow is blocked without applying the catalyst temperature increase parameter. As a result, in the calculation of the EGR-fixed cam angle (S71), the cam angle is calculated (or determined) as a maximal advance angle.

For example, in operation S72 of determining of the maximal cam advance angle, a maximal cam advance angle is determined to adjust the valve timing of the exhaust valve 130 to the maximal cam advance angle.

Subsequently, the controller 50 adjusts the cam phaser 20 with the maximal cam advance angle through the changing of the position of the cam phaser 20 (S80).

Figure 7:
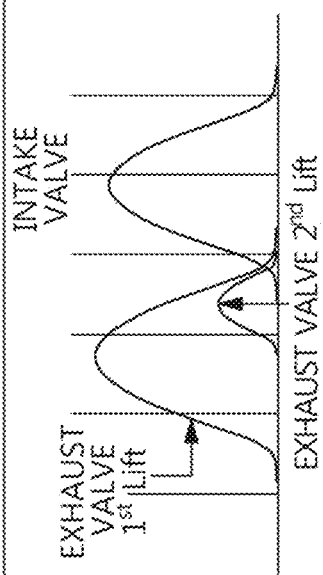

Referring to FIG. 7, the maximal cam advance angle control (S71 and S72) forms the release timing of the secondary lift (i.e., the second lift) subsequent to the release timing of the primary lift (i.e., the first lift) of the exhaust valve 130 as the closing timing of the exhaust valve 130 according to the same direction of the closing timing of the exhaust valve 130 such that the exhaust valve 130 is closed due to an advance angle equal to the existing exhaust lift period and thus the flow rate of the EGR is blocked instead of flowing as the flow rate of the internal EGR.

As described above, when a cam angle is determined as being varied by the controller 50 during operations of the double cam 12, the variable control method of exhaust temperature increase applied to the DLEV system 1 according to the present embodiment performs the cam advance angle control in which the flow rate of the internal EGR supplied to the cylinder 110 of the engine 100 is decreased due to the cam advance angle, the cam retard angle control in which the flow rate of the internal EGR is increased due to the can retard angle, the maximal cam advance angle control in which the flow rate of the internal EGR is blocked due to the maximal cam advance angle such that, even when the engine operating point is drastically varied, it is possible to meet the exhaust emission regulations through continuous control of the flow rate of the EGR. Particularly, it is possible to achieve a mechanical simplification for improving stability and productivity of the DLEV system 1 while continuously controlling the EGR using the DLEV system 1.

The variable control of exhaust temperature increase applied to the DLEV system of the present disclosure implements the following actions and effects through the exhaust temperature increase required when the LOT is adjusted to meet the exhaust emission regulations.

First, the DLEV system can continuously control the flow rate of the internal EGR inside the cylinder of the engine according to the exhaust valve timing using the variable control overcoming a limitation of cam on/off control. Second, it is possible to reduce an exhaust catalytic reaction time and meet strengthened emission regulations without degradation in PM and fuel efficiency through the continuous EGR control. Third, the structure of the DLEV system is simplified while the amount of EGR inside the cylinder is continuously varied such that it is possible to improve mechanical stability and productivity. Fourth, the EGR control can be performed according to required amounts of an engine operation condition and exhaust temperature increase through a continuous variation in an amount of the EGR inside the cylinder such that it is possible to control the engine with optimized EM/fuel efficiency. Fifth, the availability of the DLEV system can be significantly extended.

Although the foregoing description has been described with a focus on novel features of the present disclosure as being applied to various embodiments, it is to be understood by those of ordinary skill in the art that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

While the present disclosure has been described with respect to the specific embodiments, it will be apparent to those of ordinary skill in the art that various changes and modifications may be made without departing from the spirit and scope of the disclosure as defined in the following claims. Accordingly, it should be noted that such alternations or modifications fall within the claims of the present disclosure, and the scope of the present disclosure should be construed based on the appended claims.

What is claimed is:

1. A variable control method of exhaust temperature increase, comprising:
   when a cam phaser is operated, the cam phaser being connected to a double cam shaft having a coaxial arrangement structure of an outer shaft and an inner shaft, and when a cam angle is determined as being varied by a controller, performing a cam phaser position change control of decreasing a flow rate of an internal exhaust gas recirculation (EGR) supplied to a cylinder of an engine with a cam advance angle, increasing the flow rate of the EGR with a cam retard angle, or blocking the flow rate of the EGR with a maximal cam advance angle.

2. The variable control method of claim 1, wherein the cam advance angle is determined through a catalyst temperature increase by a light-off time (LOT) of a catalyst for purifying an exhaust gas emitted from the engine, and the cam advance angle is achieved by a cam advance angle control.

3. The variable control method of claim 2, wherein the cam advance angle control includes:
   determining a change of a cam angle of a double cam shaft to the cam advance angle according to an operating condition of the engine;
   determining the change of the cam angle to the cam advance angle based on an engine combustion condition or an exhaust gas purification condition; and
   checking the change of the cam angle to the cam advance angle through determining of the cam advance angle.

4. The variable control method of claim 3, wherein the operating condition includes one or more among an engine speed, an engine load, and a required amount of the catalyst temperature increase.

5. The variable control method of claim 4, wherein each of the engine speed, the engine load, and the required amount of the catalyst temperature increase is detected in an urban congestion section.

6. The variable control method of claim 3, wherein the engine combustion condition is applied when a detected air/fuel mixture ratio is smaller than a threshold of an air/fuel mixture ratio.

7. The variable control method of claim 3, wherein the exhaust gas purification condition is applied when a detected oxygen concentration stored in the catalyst is smaller than a threshold of an oxygen concentration stored in the catalyst.

8. The variable control method of claim 1, wherein the cam retard angle is determined by an increase in flow rate of the internal EGR, and the cam retard angle is achieved by a cam retard angle control.

9. The variable control method of claim 8, wherein the cam retard angle control includes:
  determining a change of a cam angle of a double cam shaft to the cam retard angle according to an operating condition of the engine;
  checking the change of the cam angle to the cam retard angle through determining of the cam retard angle.

10. The variable control method of claim 9, wherein the operating condition includes one or more among an engine speed, an engine load, and a required amount of the catalyst temperature increase.

11. The variable control method of claim 10, wherein each of the engine speed, the engine load, and the required amount of the catalyst temperature increase is detected in an urban congestion section.

12. The variable control method of claim 1, wherein a maximal cam advance angle is determined by blocking of the flow rate of the internal EGR, and the maximal cam advance angle is achieved by a maximal cam advance angle control.

13. The variable control method of claim 12, wherein the maximal cam advance angle control is performed by changing the cam angle of the double cam shaft to the maximal cam advance angle.

14. A double lift exhaust valve (DLEV) system, comprising:
  a controller configured to change a cam angle by performing a cam advance angle control in which a flow rate of an internal exhaust gas recirculation (EGR) supplied to a cylinder of an engine is decreased due to a cam advance angle, a cam retard angle control in which the flow rate of the internal EGR is increased due to a cam retard angle, and a maximal cam advance angle control in which the flow rate of the internal EGR is blocked due to a maximal cam advance angle.

15. The DLEV system of claim 14, further comprising:
  a double cam having a main cam, a first secondary cam, and a second secondary cam to allow the cam angle of the double cam to be changed due to the cam advance angle, the cam retard angle, or the maximal cam advance angle, and wherein the controller is in conjunction with a double cam shaft connected to a cam phaser.

16. The DLEV system of claim 15, wherein the double cam shaft includes an outer shaft to which the main cam is coupled, and an inner shaft configured to be surrounded by the main cam to position the first secondary cam to a left side of the main cam and to position the second secondary cam to a right side of the main cam.

17. The DLEV system of claim 16, wherein the first secondary cam and the second secondary cam are fixed to the inner shaft via a power transmission key.

* * * * *